United States Patent [19]

Hofle

[11] 4,062,380
[45] Dec. 13, 1977

[54] HOSE CONSTRUCTION
[75] Inventor: Anatoli Hofle, Candler, N.C.
[73] Assignee: Dayco Corporation, Dayton, Ohio
[21] Appl. No.: 736,650
[22] Filed: Oct. 28, 1976
[51] Int. Cl.$^2$ ............................................. F16L 11/04
[52] U.S. Cl. .................................... 138/122; 138/129; 138/154
[58] Field of Search ................... 138/122, 129, 154; 156/143

[56] References Cited

U.S. PATENT DOCUMENTS

| | | | |
|---|---|---|---|
| 2,154,942 | 4/1939 | Karmazin | 138/154 X |
| 2,444,008 | 6/1948 | Fentress | 138/122 |
| 2,890,723 | 6/1959 | Evert | 138/122 |
| 3,679,531 | 7/1972 | Wienand et al. | 138/154 X |

FOREIGN PATENT DOCUMENTS

| | | | |
|---|---|---|---|
| 688,833 | 6/1964 | Canada | 138/122 |
| 349,051 | 2/1922 | Germany | 138/122 |
| 641,090 | 8/1950 | United Kingdom | 138/129 |

Primary Examiner—Richard E. Aegerter
Assistant Examiner—James E. Bryant, III
Attorney, Agent, or Firm—Reuben Wolk

[57] ABSTRACT

A convoluted hose construction is provided and comprises an elongated elastomeric strip having a base and first and second connecting members extending in the same direction from the base with the first connecting member extending from a central part of the base to define a lateral extension of the base outwardly of the first connecting member and the second connecting member extending from an end portion of the base. The strip is disposed in a helical pattern with the first and second connecting members connected to define the hose construction having a plurality of helical turns defining alternating crests and troughs and the lateral extension cooperates with the base to provide the hose construction with a substantially smooth inside surface even with the hose construction extending in a curved path.

20 Claims, 6 Drawing Figures

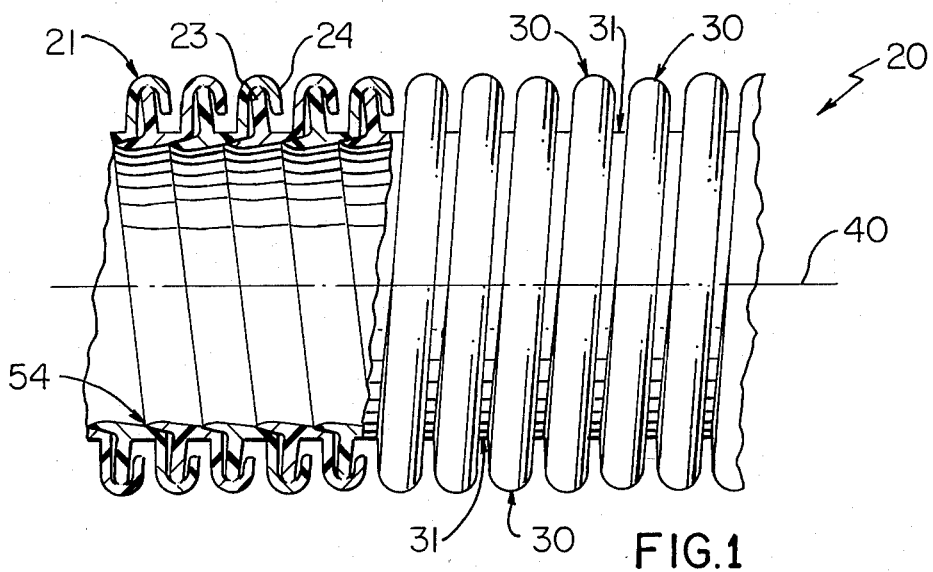
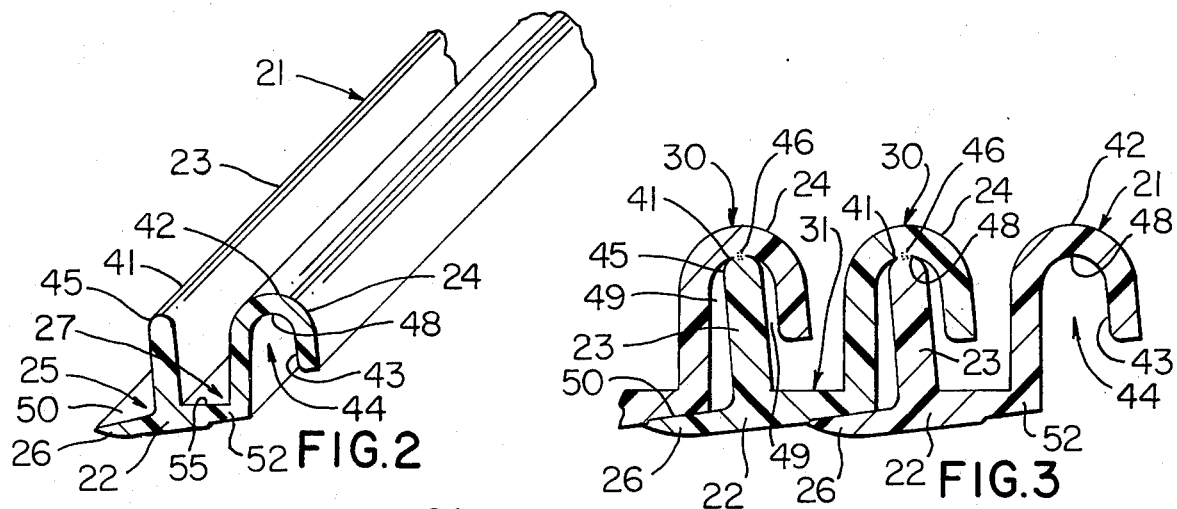
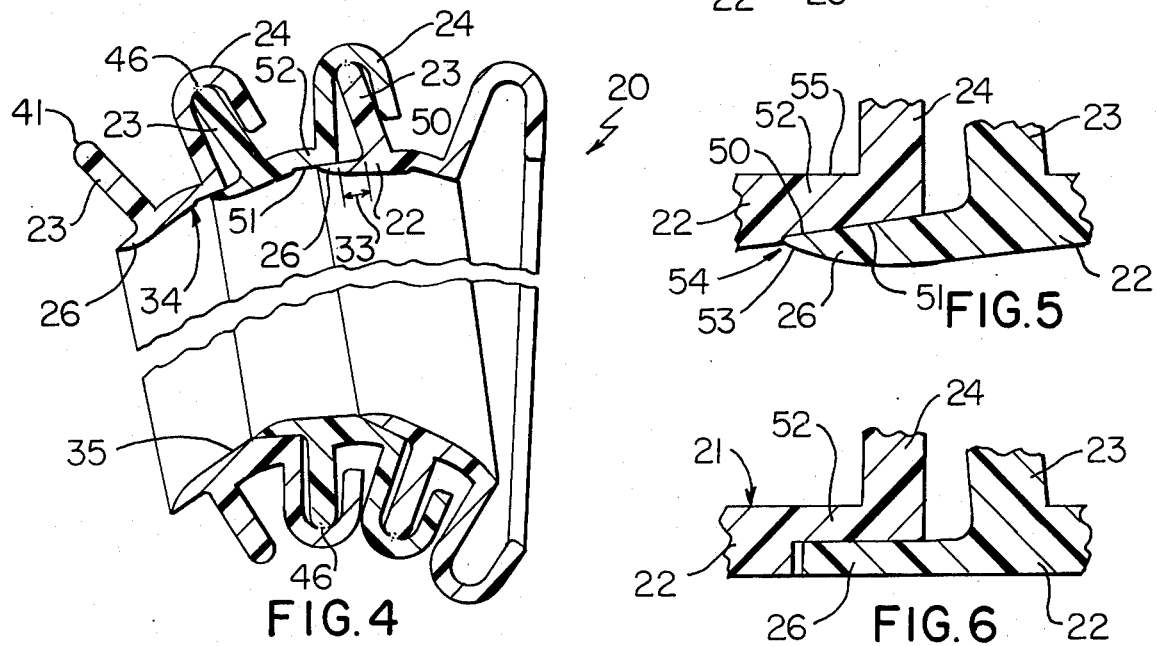

HOSE CONSTRUCTION

BACKGROUND OF THE INVENTION

Convoluted hose constructions made of one or more strips of helically wound elastomeric material are well known in the art. However, many of such hose constructions have comparatively poor structural properties, others of such hose constructions are expensive to produce, still others of such hose constructions have poor flexibility, and yet others of such hose constructions have gaps or irregularities defining their inside surfaces and thereby producing poor air flow characteristics and areas for trapping and accumulating material flowing therethrough.

SUMMARY

It is a feature of this invention to provide an economical hose construction made from a single strip of elastomeric material.

Another feature of this invention is to provide a hose construction of the character mentioned having improved structural integrity.

Another feature of this invention is to provide a hose construction which is highly flexible yet has a smooth inside surface free of gaps or irregularities capable of trapping materials flowing through the hose construction.

Another feature of this invention is to provide a convoluted base construction made of an elongated elastomeric strip having a base and first and second connecting members extending in the same direction from the base with the first connecting member extending from a central part of the base to define a lateral extension of the base outwardly of the first connection member and the second connecting member extending from an end portion of the base. The strip is disposed in a helical pattern with the first and second connecting members connected to define the hose construction having a plurality of helical turns defining alternating crests and troughs and the lateral extension in each helical turn of the strip slideably engages the base beneath the second connecting member in underlapping relation to provide the hose construction with a substantially smooth inside surface. The smooth inside surface is provided even with the hose construction extending in a curved path due to the lateral extension slideably engaging the base portion and bridging any gap which would otherwise be produced in the inside surface along an outer radius of such curved path.

Accordingly, it is an object of this invention to provide a hose construction having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which:

FIG. 1 is a view with parts in cross section, parts in elevation, and parts broken away illustrating an exemplary embodiment of a hose construction of this invention made from an elongated strip of elastomeric material which has been wound in a helical pattern with connecting means thereof suitably interconnected;

FIG. 2 is a fragmentary perspective view of the strip used to make the hose construction of FIG. 1;

FIG. 3 is a fragmentary cross-sectional view particularly illustrating the manner in which portions of the strip of FIG. 2 are interconnected employing integral connecting means thereof;

FIG. 4 is an enlarged cross-sectional view with the central part thereof broken away particularly illustrating the manner in which the hose construction of this invention may be flexed or curved from a relaxed condition thereof and yet such hose construction maintains a substantially smooth inside surface;

FIG. 5 is an enlarged fragmentary cross-sectional view particularly illustrating a lateral extension at one side of the base of the elongated strip which is helically wound to define the hose construction of FIG. 1 and showing the manner in which such extension assures provision of a hose construction having a substantially smooth inside surface; and FIG. 6 is a view similar to FIG. 5, particularly illustrating a modified lateral extension of an elongated strip.

DESCRIPTION OF ILLUSTRATED EMBODIMENTS

Reference is now made to FIG. 1 of the drawing which illustrates one exemplary embodiment of an elongated convoluted hose construction or hose of this invention which is designated generally by the reference numeral 20. The hose 20 is made of a single elongated elastomeric strip which is designated generally by the reference numeral 21 and the construction of such strip is such that the hose has a substantially smooth inside surface even with the hose extending in a curved path and as will be readily apparent from the following description.

As seen in FIG. 2 the strip 21 is a single-piece structure and has a base portion or base 22 with first and second connection means designated by the reference numerals 23 and 24 respectively extending in the same direction from the base 22 and the first connecting means 23 extends from a central part of the base 22 as shown at 25 to define what will be referred to as a lateral extension 26 of the base disposed outwardly of the first connecting means 23. Similarly, it will be seen that the second connecting means 24 extends from an end portion of the base 22 as shown at 27.

The strip 21 is disposed in a helical pattern with its first and second connecting means or integral members 23 and 24 respectively connected to define the hose 20 having a plurality of helical turns defining alternating crests 30 and troughs 31. As will be readily apparent from FIG. 3, the lateral extension 26 in each helical turn of the strip 21 slideably engages the base 22 beneath the second connecting means or member 24 in what will be referred to as underlapping relation to provide the hose with a substantially smooth inside surface.

As seen in FIG. 4, the smooth inside surface is provided in hose 20 even with such hose extending in a curved path due to the lateral extension 26 slideably engaging the base 22 and bridging any gap such as a typical gap having a width as shown at 33 which would otherwise be produced on an outer radius 34 of such curved path. Once the hose 20 extends in a curved path as shown in FIG. 4 the extensions 26 thereof are underlapped such that there is practically no gap produced along the inner radius portion 35 of such hose 20.

As best seen in FIG. 3, the first connecting means or member 23 comprises an elongated substantially I-shaped projection which with the hose in a relaxed or uncurved condition is disposed substantially perpendicular to a longitudinal axis 40 of the hose 20. The I-shaped projection 23 has a rounded terminal outside surface 41 which is adapted to be fixed against a cooperating surface of the second connecting means or member 24 in a manner to be described in detail subsequently.

The second connecting means or member 24 is in the form of a hooking member having a reverse J-shaped configuration with a rounded outside surface 42 which defines corresponding rounded crests 30 of the hose construction. The J-shaped member 24 has an inside surface 43 defining a recess 44 which is adapted to receive the terminal end portion 45 of the I-shaped connecting member or projection 23 therein; and, in particular the rounded outside surface 41 of the outer portion 45 of member 23 is adapted to be received against the innermost rounded portion 48 of inside surface 43.

The hose 20 has suitable adhesive means bonding the I-shaped projection 23 within the J-shaped hooking member 24 and in particular such adhesive means is in the form of an adhesive bonding material 46 providing a high strength unitary bond between members 23 and 24. The members 23 and 24 are bonded by the adhesive means 46 adjacent their terminal outer portions by bonding the outside rounded surface 41 against the innermost rounded portion 48 of surface 43 and it will be seen that a space 49 is provided between each side of the member or projection 23 and the J-shaped member 24. The space 49 allows unobstructed flexing movement of the hose 20. It will also be seen that the lateral extension 26 is free of any adhesive means or bonding material and thus an inside surface 50 thereof is free to slide along the inside surface 51 of the base 22 and the detailed construction of lateral extension 26 will now be described in more detail.

As best seen in FIG. 5 of the drawings, the base 22 beneath the J-shaped connecting member 24 has what may be considered a reduced thickness portion 52 and the inside surface 51 also defines the inside surface of the reduced thickness portion 52. It will also be seen that the lateral extension 26 has a tapered terminal end portion in the form of a sharp substantially wedge-like terminal end portion 53; and, the wedge-like terminal end portion 53 of a particular helical turn is adapted to engage and blend smoothly with surface 51 of an adjoining turn as shown at 54 to thereby provide minimum interruption on the inside surface of the hose 20 and define an inside surface which is free of abrupt projections.

The hose 20 has alternating crests 30 and troughs 31 and as previously mentioned the crests 30 are defined by the outside rounded surfaces of the J-shaped members 24. The troughs 31 are defined by an externally arranged surface 55 of the helically wound strip 21 and lower oppositely arranged parts at the bases of the members 23 and 24.

A modification of the hose 20 of this invention is illustrated in FIG. 6 of the drawing. In the modification of FIG. 6, the hose 20 is defined from an elongated strip 21 which also has a base portion 22 and cooperating connecting members 23 and 24. However, it will be seen that the base portion 22 has a reduced thickness portion 52 defined by a cutout of substantially rectangular outline and the reduced thickness portion 52 is adapted to receive a cooperating extension 26 which is correspondingly dimensioned so that it engages and nests within the reduced thickness portion and is slideably received along the inside surface to thereby assure the provision of a hose construction having a substantially smooth inside surface free of abrupt projections or the like.

The adhesive means 46 utilized to bond the connecting means 23 and 24 may be of any suitable type known in the art. In particular, such ashesive means may be a molten plastic adhesive which is applied at elevated temperatures and then solidifies once cooled to normal room temperature, the adhesive means 46 may be any commercially available adhesive, or such adhesive means 46 may be in the form of a solvent of any type known in the art which causes softening of the elastomeric material defining the strip 21 and upon evaporation of the volatile constituents of the solvent a single piece unitary mass is provided similar to a single piece unitary mass which is provided by a commercial adhesive.

As mentioned earlier, the hose 20 is highly flexible due to the construction and arrangement of its connecting means 23 and 24 the bonding of such connection means 23 and 24 by adhesive means 46 acting basically at the outer extremities of members 23 and 24, and the space 49 provided on either side of the I-shaped connecting member 23. However, even with this flexibility the bridging action provided by lateral extension 26 assures that the hose 20, even when bent or flexed, has a substantially smooth inside surface free of areas or locations likely to trap materials flowing through such hose.

The elongated strip 20 of this invention may be made in any suitable manner known in the art utilizing any suitable technique. Preferably such strip is made by extrusion process and of a suitable thermoplastic material.

While present exemplary embodiments of this invention, and methods of practicing the same, have been illustrated and described, it will be recognized that this invention may be otherwise variously embodied and practiced within the scope of the following claims.

What is claimed is:

1. A flexible convoluted hose construction comprising, an elongated single-piece elastomeric strip having a base and first and second connecting means extending in the same direction from said base, said first connecting means extending from a central part of said base to define a lateral extension of said base outwardly of said first connecting means and said second connecting means extending from an end portion of said base, said strip being disposed in a helical pattern with said first and second connecting means connected to define said hose construction having a plurality of helical turns defining alternating crests and troughs, said lateral extension in each helical turn of said strip slideably engaging said base beneath said second connecting means in underlapping relation to provide said hose construction with a substantially smooth inside surface, said smooth inside surface being provided even with said hose construction extending in a curved path due to said lateral extension slideably engaging said base portion and bridging any gap which would otherwise be produced in said inside surface along an outer radius of said curved path.

2. A hose construction as set forth in claim 1, in which said first connecting means comprises an elongated projection disposed substantially perpendicular to a longitudinal axis of said hose construction with said hose construction disposed in a straight relaxed configuration.

3. A hose construction as set forth in claim 2 in which said second connecting means comprises a hooking member having a rounded outside surface defining said crests of said hose construction.

4. A hose construction as set forth in claim 3 in which said hooking member has an inside surface defining a recess which is adapted to receive a terminal end portion of said first connecting means therewithin and further comprising means bonding said first connecting means against said inside surface or said hooking member.

5. A hose construction as set forth in claim 4 in which said hooking member when viewed in cross section has the appearance of a reversed J-shaped member.

6. A hose construction as set forth in claim 5 in which said hooking member has a rounded innermost inside surface, and said first connecting member when viewed in cross section has the appearance of an I-shaped member with a rounded terminal outer end, said outer end being adapted to be received against said rounded innermost inside surface.

7. A hose construction as set forth in claim 6 in which said I-shaped and J-shaped members have a substantially uniform thickness throughout.

8. A hose construction as set forth in claim 1 in which said lateral extension has a reduced thickness terminal end portion which is adapted to engage said base and provide minimum interruption in the inside surface of said hose construction.

9. A hose construction as set forth in claim 8 in which said reduced thickness terminal end portion has a sharp substantially wedge-like terminal end.

10. A hose construction as set forth in claim 1 in which said base beneath said second connecting means has a reduced thickness portion, and said lateral extension has a terminal end portion which is adapted to be received against said reduced thickness portion to define said smooth inside surface.

11. A hose construction as set forth in claim 1 in which each of said troughs of said hose construction is defined by an exterior part of said base and adjoining oppositely arranged parts at the base of said connecting means.

12. A hose construction as set forth in claim 1 in which said elongated elastomeric strip is a strip of thermoplastic material.

13. A flexible convoluted hose construction comprising, an elongated single-piece elastomeric strip made of a thermoplastic material having a base and first and second connecting means of substantially uniform thickness extending in the same direction from said base, said first connecting means extending from a central part of said base to define a lateral extension of said base outwardly of said first connecting means and said second connecting means extending from a terminal end portion of said base, said strip being disposed in a helical pattern with said first and second connecting means connected to define said hose construction having a plurality of helical turns defining alternating crests and troughs, said lateral extension in each helical turn of said strip slideably engaging said base beneath said second connecting means in underlapping relation to provide said hose construction with a substantially smooth inside surface, said smooth inside surface being provided even with said hose construction extending in a curved path due to said lateral extension slideably engaging said base portion and bridging any gap which would otherwise be produced in said inside surface along an outer radius of said curved path.

14. A hose construction as set forth in claim 13 in which said first connecting means comprises an elongated I-shaped projection disposed substantially perpendicular to a longitudinal axis of said hose construction with said hose construction disposed in a straight relaxed configuration.

15. A hose construction as set forth in claim 14 in which said second connecting means comprises a J-shaped hooking member having a substantially semicircular outside surface defining said crests of said hose construction.

16. A hose construction as set forth in claim 15 in which said J-shaped hooking member has an inside surface defining a recess which is adapted to receive a terminal end portion of said I-shaped projection therewithin and further comprising adhesive means bonding said I-shaped projection against said inside surface of said J-shaped hooking member.

17. A hose construction as set forth in claim 16 in which said J-shaped hooking member when viewed in cross section has a semicircular innermost inside surface, and said I-shaped projection when viewed in cross section has a semicircular terminal outer end, said terminal outer end being adapted to be received against said innermost inside surface.

18. A hose construction as set forth in claim 17 in which said lateral extension has a reduced thickness terminal end portion which is adapted to engage said base and provide minimum interruption in the inside surface of said hose construction.

19. A hose construction as set forth in claim 18 in which said reduced thickness terminal end portion has a sharp substantially wedge-like terminal end.

20. A hose construction as set forth in claim 18 in which said base beneath said second connecting means has a rectangular cutout defining a reduced thickness portion, and said lateral extension has a rectangular terminal end portion which is adapted to be slideably received along said cutout to define said smooth inside surface.

* * * * *